(No Model.)

F. A. CRANE.
SEEDER.

No. 482,470. Patented Sept. 13, 1892.

Witnesses
Wm. A. Schoenborn.
John M. Siggers.

Inventor
Fred A. Crane.
By his Attorneys,
C. A. Snow & Co.

UNITED STATES PATENT OFFICE.

FRED A. CRANE, OF GOOD HOPE, ILLINOIS.

SEEDER.

SPECIFICATION forming part of Letters Patent No. 482,470, dated September 13, 1892.

Application filed May 31, 1892. Serial No. 435,024. (No model.)

*To all whom it may concern:*

Be it known that I, FRED A. CRANE, a citizen of the United States, residing at Good Hope, in the county of McDonough and State of Illinois, have invented a new and useful Broadcast Seeder, of which the following is a specification.

My invention relates to improvements in broadcast seeders, and to that particular class thereof operated manually and commonly known as "hand-seeders."

The objects in view are to provide a cheap and simple machine that may be conveniently carried and operated, which will effectually sow the seed with but little exertion upon the part of the operator, and whose feed may be conveniently regulated or cut off.

With these objects in view the invention consists in certain features of construction hereinafter specified, and particularly pointed out in the claim.

Figure 1:
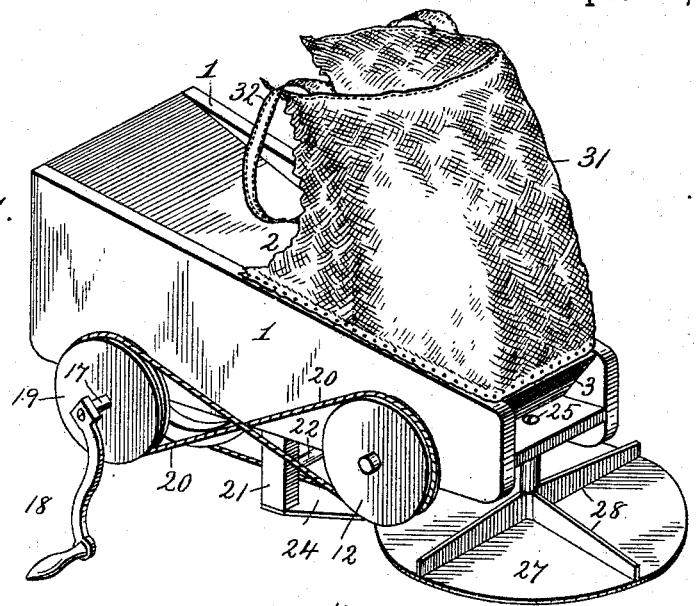
Figure 2:
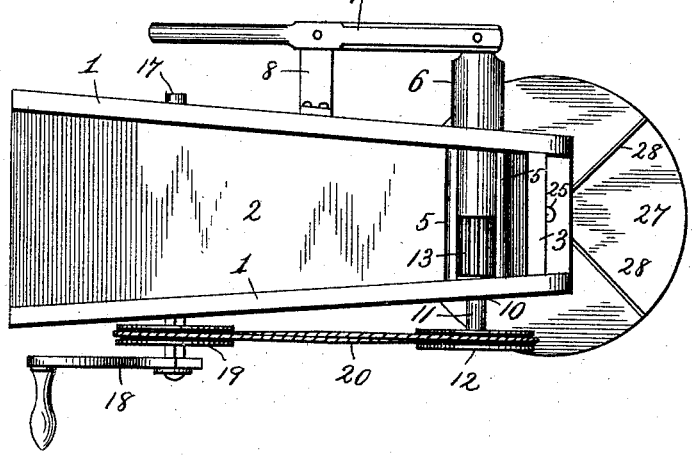
Figure 3:
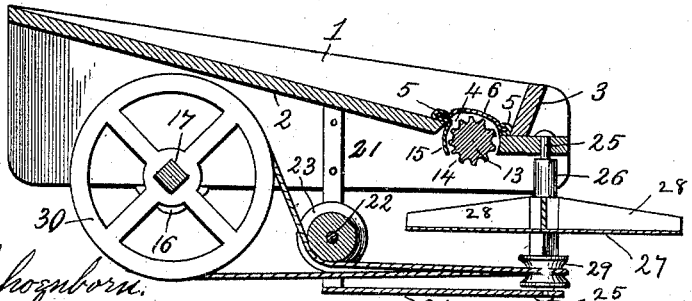

Referring to the drawings, Figure 1 is a perspective view of a seeding-machine constructed in accordance with my invention. Fig. 2 is a plan view, the seed sack or bag being removed. Fig. 3 is a longitudinal section of the machine.

Like numerals of reference indicate like parts in all the figures of the drawings.

1 designates the opposite side or longitudinal frame-bars, which are connected with an inclined bottom 2 and are converged slightly toward their front ends, where they are connected by an end frame-bar 3. The frame-bar 3 is inclined and at the lower edge of the same the bottom is provided with a transverse feed-slot 4, at opposite sides of which transverse parallel ways 5 are located. In this slot is mounted for movement a transversely-reciprocating cut-off or feed-regulator 6, and the same is connected at its outer end pivotally to the front end of a small hand-lever 7, which is fulcumed on a laterally-projecting arm 8, extending from one of the side frame-bars 1. Bearing-openings 10 are formed in the frame-bars 1 below and opposite the feed-slot, and in the same a transverse shaft 11 is mounted for rotation. The shaft 11 is provided at its outer end, which extends beyond its bearing, with a grooved pulley 12, and between its bearings with a feed-roll 13, which fits within and occupies the feed-slot of the bottom and has its periphery provided with a series of parallel corrugations or seed-receiving grooves 14. The rear side of the roll is partially encircled by a curved guard-plate 15, which is secured to the rear edge of the feed-slot and depends therefrom.

Bearings 16 are located upon the lower edges and near the rear ends of the bars 1, and a transverse power-shaft 17 is journaled in the bearings and has one end extended beyond one of the same. This power-shaft has a crank 18 upon its extended end, adapted to be operated manually, and also carries a grooved pulley 19, which is connected to the pulley 12 by a crossed belt 20. By operating the crank-shaft motion will be imparted from pulley to pulley, and thence to the shaft 11 and the feed-roll, the seed being caught by the groove of the roll and discharged below the same in a manner that will be obvious.

Standards 21 depend from the frame-bars 1 near their centers, and in the same is journaled a transverse counter-shaft 22, carrying a small guide-pulley 23. A triangular plate 24 extends forwardly from the lower ends of the standards 21, and it and the front end of the bottom 2 are provided with bearing-openings through which bearing-pins 25 are passed, said pins bearing in the ends of a vertical shaft 26. This shaft carries a suitable disk 27, the upper side of which is provided with a series of radial flanges or ribs 28, and upon its under side and secured to the disk there is a pulley 29. A belt 20 encircles the pulley 29, runs over the guide-pulley 23, and passes around a grooved drive-pulley 30, which is mounted upon the shaft 17 and rotates therewith. This completes the construction, with the exception of a flexible sack or bag 31, in which the seed is carried, and a strap 32, connected at its ends to the machine and adapted to support the latter by being passed about the shoulder of the operator.

In operation the inclined bottom feeds the seed to the discharge-slot, which is opened to a desired extent and to produce the desired scattering, after which it is simply necessary to rotate the drive-shaft through the medium of the crank, which is manipulated by one hand, leaving the remaining hand of the operator free to operate the cut-off or regulator and to aid in the support of the machine.

The seed flowing from the feed-roll as its grooves are successively brought to their lower positions falls upon the scattering-disk, where it is caught by the flanges thereof and broadcast therefrom by centrifugal force. When the machine is not in operation, as when going to or coming from the field, the cut-off may be closed or slid over the feed-slot, and no spilling of the seed will occur.

From the foregoing description, in connection with the accompanying drawings, it will be seen that I have provided a cheap and simple broadcast hand-seeder that will effectually operate and may be conveniently carried, operated, and regulated.

Having described my invention, what I claim is—

The combination, with the opposite side bars 1, the inclined bottom, the end wall for the side bars, and the feed-opening in the bottom, of a shaft journaled in the side bars below the bottom, feed devices mounted on the shaft, a pulley on the outer end of the shaft, a rear drive-shaft having a crank, large and small pulleys on said shaft, a crossed belt connecting the small pulley with the pulley of the feed-shaft, a pair of depending standards located in front of the drive-shaft, a transverse shaft connecting the two, a guide-pulley thereon, a plate extending forward from the lower ends of the standards, a shaft vertically disposed and pivotally supported between the front end of the plate and the bottom of the hopper, the seed-disk mounted on the shaft, the pulley below the disk, and the belt connecting the pulley with the large pulley of the drive-shaft and between the two passed over the guide-pulley, substantially as specified.

In testimony that I claim the foregoing as my own I have hereto affixed my signature in the presence of two witnesses.

FRED A. CRANE.

Witnesses:
W. R. ALLISON,
C. W. FAUL.